(12) United States Patent
Ishii et al.

(10) Patent No.: US 8,824,686 B1
(45) Date of Patent: Sep. 2, 2014

(54) CLUSTER KEY SYNCHRONIZATION

(75) Inventors: Hiroshi Ishii, Sunnyvale, CA (US); Hristo Bojinov, Sunnyvale, CA (US); Ananthan Subramanian, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1780 days.

(21) Appl. No.: 11/741,495

(22) Filed: Apr. 27, 2007

(51) Int. Cl.
*H04L 9/08* (2006.01)

(52) U.S. Cl.
CPC ........................................ *H04L 9/08* (2013.01)
USPC ............ 380/279; 380/277; 380/278; 380/260; 380/261; 380/243; 380/244; 380/274; 380/286; 713/150; 709/201; 709/202; 709/203; 707/610; 707/620; 707/621; 707/622

(58) Field of Classification Search
CPC ........................................................ H04L 9/08
See application file for complete search history.

(56) References Cited

U.S. PATENT DOCUMENTS

| | | | |
|---|---|---|---|
| 1,310,719 | A | 7/1919 | Vernam |
| 4,262,329 | A | 4/1981 | Bright et al. |
| 4,558,176 | A | 12/1985 | Arnold et al. |
| 4,588,991 | A | 5/1986 | Atalla |
| 4,757,533 | A | 7/1988 | Allen et al. |
| 5,065,429 | A | 11/1991 | Lang |
| 5,150,407 | A | 9/1992 | Chan |
| 5,185,717 | A | 2/1993 | Mori |
| 5,235,641 | A | 8/1993 | Nozawa |
| 5,235,642 | A | 8/1993 | Wobber et al. |
| 5,265,159 | A | 11/1993 | Kung |
| 5,265,164 | A | 11/1993 | Matyas et al. |
| 5,677,952 | A | 10/1997 | Blakeley, III et al. |
| 5,687,237 | A | 11/1997 | Naclerio |
| 5,720,034 | A | 2/1998 | Case |
| 5,850,448 | A | 12/1998 | Ganesan |
| 5,870,468 | A | 2/1999 | Harrison |
| 5,931,947 | A | 8/1999 | Burns |

(Continued)

FOREIGN PATENT DOCUMENTS

| WO | WO 02/093314 A2 | 11/2002 |
|---|---|---|
| WO | WO 02/093314 A3 | 11/2002 |

OTHER PUBLICATIONS

Decru, A NetApp Company, "Enterprise-Wide Storage Security with Decru DataFort Appliances", 2005, pp. 1-9.*

(Continued)

*Primary Examiner* — Luu Pham
*Assistant Examiner* — Canh Le
(74) *Attorney, Agent, or Firm* — Cesari and McKenna, LLP

(57) ABSTRACT

Apparatus and method for synchronizing encryption keys among a cluster of security appliances and stand alone lifetime key management, LKM, appliances. The cluster includes security appliances where new encryption keys are generated and assigned to an SNS ID with an SNS CTR (counter). The security appliances inside a cluster have local sequence counters and share their keys. One security appliance is a coordinator with which the LKMs will synchronize. Each LKM also has a SNS ID and local sequence counter from which increasing sequence numbers are generated. In each security appliance in a cluster, the up-to-date stored sets of keys are organized with respect to SNS IDs and SNS CTRs associated with the other cluster members. The object keys are stored in the SNS space and a peer map associates a given peer with a given SNS ID, and version numbers are assigned and incremented when a key is modified.

10 Claims, 6 Drawing Sheets

(56) References Cited

U.S. PATENT DOCUMENTS

| | | | |
|---|---|---|---|
| 5,933,498 A | 8/1999 | Schneck et al. | |
| 5,940,507 A | 8/1999 | Cane | |
| 5,940,826 A * | 8/1999 | Heideman et al. | 1/1 |
| 5,991,406 A | 11/1999 | Lipner et al. | |
| 6,073,237 A | 6/2000 | Ellison | |
| 6,119,098 A | 9/2000 | Guyot et al. | |
| 6,134,660 A | 10/2000 | Boneh et al. | |
| 6,175,924 B1 | 1/2001 | Arnold | |
| 6,185,681 B1 | 2/2001 | Zizzi | |
| 6,185,684 B1 | 2/2001 | Pravetz et al. | |
| 6,212,280 B1 * | 4/2001 | Howard et al. | 380/279 |
| 6,212,600 B1 | 4/2001 | Friedman et al. | |
| 6,247,135 B1 * | 6/2001 | Feague | 713/400 |
| 6,249,866 B1 | 6/2001 | Brundrett et al. | |
| 6,256,735 B1 | 7/2001 | Maria | |
| 6,272,632 B1 | 8/2001 | Carman et al. | |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,684,222 B1 | 1/2004 | Cornelius et al. | |
| 6,735,693 B1 | 5/2004 | Hamlin | |
| 6,754,827 B1 | 6/2004 | Cane et al. | |
| 6,792,544 B2 | 9/2004 | Hashem | |
| 6,839,437 B1 | 1/2005 | Crane et al. | |
| 6,847,993 B1 * | 1/2005 | Novaes et al. | 709/221 |
| 6,851,056 B2 | 2/2005 | Evans | |
| 6,857,076 B1 | 2/2005 | Klein | |
| 6,868,406 B1 | 3/2005 | Ogg et al. | |
| 6,915,435 B1 | 7/2005 | Merriam | |
| 6,931,133 B2 | 8/2005 | Andrews et al. | |
| 6,993,661 B1 | 1/2006 | Garfinkel | |
| 7,003,674 B1 | 2/2006 | Hamlin | |
| 7,020,779 B1 | 3/2006 | Sutherland | |
| 7,093,127 B2 | 8/2006 | McNulty et al. | |
| 7,096,355 B1 | 8/2006 | Marvit et al. | |
| 7,120,696 B1 | 10/2006 | Au et al. | |
| 7,136,995 B1 | 11/2006 | Wann | |
| 7,139,917 B2 | 11/2006 | Jablon | |
| 7,146,505 B1 | 12/2006 | Harada et al. | |
| 7,188,253 B2 | 3/2007 | Halasz et al. | |
| 7,215,771 B1 | 5/2007 | Hamlin | |
| 7,222,228 B1 | 5/2007 | Stephens et al. | |
| 7,240,197 B1 | 7/2007 | Yamagami et al. | |
| 7,260,724 B1 | 8/2007 | Dickinson et al. | |
| 7,340,500 B2 | 3/2008 | Traversat et al. | |
| 7,346,160 B2 | 3/2008 | Michaelsen | |
| 7,383,436 B2 | 6/2008 | Srivastava et al. | |
| 7,729,496 B2 * | 6/2010 | Hacigumus | 380/277 |
| 2001/0054155 A1 | 12/2001 | Hagan et al. | |
| 2002/0046286 A1 | 4/2002 | Caldwell et al. | |
| 2002/0073324 A1 | 6/2002 | Hsu | |
| 2002/0110244 A1 | 8/2002 | Flanagan et al. | |
| 2002/0114453 A1 | 8/2002 | Bartholet et al. | |
| 2003/0021417 A1 | 1/2003 | Vasic et al. | |
| 2003/0028765 A1 | 2/2003 | Cromer et al. | |
| 2003/0088866 A1 | 5/2003 | Boldon et al. | |
| 2004/0030668 A1 | 2/2004 | Pawlowski et al. | |
| 2004/0107342 A1 | 6/2004 | Pham et al. | |
| 2004/0153642 A1 * | 8/2004 | Plotkin et al. | 713/150 |
| 2004/0243284 A1 * | 12/2004 | Dutta et al. | 701/1 |
| 2005/0018853 A1 | 1/2005 | Lain et al. | |
| 2005/0141717 A1 | 6/2005 | Cromer et al. | |
| 2006/0078124 A1 * | 4/2006 | Whelan et al. | 380/273 |
| 2007/0014314 A1 * | 1/2007 | O'Neil | 370/503 |
| 2007/0058801 A1 | 3/2007 | Plotkin | |
| 2007/0076889 A1 * | 4/2007 | DeRobertis et al. | 380/279 |
| 2007/0086335 A1 * | 4/2007 | McCanne et al. | 370/229 |
| 2007/0174634 A1 | 7/2007 | Plotkin | |
| 2007/0260592 A1 * | 11/2007 | Anglin et al. | 707/4 |
| 2008/0101610 A1 | 5/2008 | Birk et al. | |
| 2008/0187007 A1 * | 8/2008 | Goyal et al. | 370/503 |
| 2008/0189440 A1 * | 8/2008 | Goyal et al. | 709/248 |
| 2008/0222212 A1 * | 9/2008 | Prasad et al. | 707/201 |
| 2008/0301791 A1 | 12/2008 | Smith et al. | |
| 2009/0089450 A1 | 4/2009 | Weatherford et al. | |
| 2009/0089867 A1 | 4/2009 | Weatherford et al. | |

OTHER PUBLICATIONS

Adrian Baldwin and Simon Shiu, "Encryption and Key management in a SAN", IEEE Computer Society, 2003, pp. 1-10.*

Roman Pletka and Christian Cachin, "Cryptographic Security for a High-Performance Distributed File System", Research Report, Sep. 11, 2006, pp. 1-19.*

Anderson, et al., "The Steganographic File System," Information Hiding, Second International Workshop, IH '98 Portland, Oregon. USA, Apr. 14-17, 1998, Proceedings, pp. 73-82, 1998.

Antonelli, et al., "The Packet Vault: Secure Storage of Network Data," CITI Technical Report 98-5, pp. 1-15, Jun. 25, 1998.

Baldwin, et al., "Encryption and Key Management in a SAN," Hewlett Packard Laboratories, Bristol, UK, 10 pages, 2002.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Bojinov, et al., Apparatus for Lifetime Key Management, U.S. Appl. No. 11/740,474, filed on Apr. 26, 2007, 26 pages.

Bojinov, et al., Encryption Keys for Data Recovery in Storage Security Appliances, U.S. Appl. No. 11/532,025, filed on Sep. 14, 2006, 16 pages.

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

(56) References Cited

OTHER PUBLICATIONS

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Gandhasri, R., Host Based Rekeying, U.S. Appl. No. 11/772,447, filed Sep. 4, 2007, 25 pages.

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81,1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Ishii, H., et al., Peer to Peer Key Synchronization, U.S. Appl. No. 11/740,490, filed Apr. 26, 2007, 31 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Subramanian, A., et al., System and Method for Initial Key Establishment Using a Split Knowledge Protocol, U.S. Appl. No. 11/540,440, filed Sep. 29, 2007, 27 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 139, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

Menezes et al., "Handbook of Applied Cryptography," CRC Press, pp. 1-794, 1997.

\* cited by examiner

CLUSTER KEY SYNCHRONIZATION

CROSS REFERENCE TO RELATED APPLICATIONS

The present application is related to commonly owned U.S. patent applications: patent application Ser. No. 11/740,474 entitled, "Apparatus for Lifetime Key Management," by Hristo Bojinov et al., filed Apr. 26, 2007; and U.S. patent application Ser. No. 11/740,490 entitled, "Peer to Peer Key Synchronization," by Hristo Bojinov et al., filed Apr. 26, 2007. These related applications are hereby incorporated herein by reference.

BACKGROUND OF THE INVENTION

1. Field of the Invention

The present invention relates to secure systems, and more specifically, to clustered security systems communicating with lifetime key management (LKM) appliances, wherein encryption keys are distributed and synchronized among the processing entities in the system.

2. Background

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to predefined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). As known to those skilled in the art, a WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others, a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided, wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Security systems often contain many cryptainers that are to be managed by a single security appliance or by multiple security appliances arranged, for example in a cluster, employing and sharing encryption keys (herein "key" and "encryption key" are used interchangeably) with each other and with non-clustered systems. When a cluster of multiple security appliances is managed, often a LKM (Lifetime Key Management) appliance is a resource. However, some systems employ multiple LKMs and, correspondingly, the multiple LKMs are synchronized. As a result, an administrator may simply not be able to coordinate the management and synchronizations needed.

Another limitation of clustered security appliances occurs when keys (key objects) are created on one security appliance, but that appliance then becomes inactive. In such a case, objects created may not be synchronized throughout the security appliance cluster and LKMs.

SUMMARY OF THE INVENTION

The limitations described above are addressed by a system and protocol for synchronizing objects, illustratively key objects, among a cluster of security appliances and standalone LKMs (Lifetime Key Management), by assigning sequence numbers to key objects and storing those objects in identified spaces. The sequence numbers allow synchronization of the identified spaces, as compared to synchronizing appliances. Each identified space has a sequence counter associated with it, where the sequence counter tracks the number of key objects synchronized. Illustratively, only those key objects with sequence numbers equal to or higher than the sequence number held in another appliance are transferred during synchronization.

An identified space in the illustrative examples discussed herein is a persistent (sometimes referred to as non-volatile) group of memory locations that are identified by a unique identification number (ID). The ID is used to distinguish the contents of other identified spaces.

An example of a cluster as used herein is a group of security appliances that elect one security appliance to act as a leader or coordinator. The cluster is characterized by sharing the encryption keys generated within any one security appliance among all the security appliances. Illustratively, stand alone LKM appliances synchronize only with the coordinator security appliance.

Herein and as used below, when an appliance, such as an LKM communicates with another LKM, the latter is defined herein as a "peer." LKMs and/or security appliances, illustratively, communicate over a link and embody the only "nodes" in the system shown. In such an arrangement, each LKM at each node may have a series of identified spaces for storing key objects and associated counters that are synchronized with their "peers."

The present invention is described below with respect to encryption keys in secure storage systems, but as known to those skilled in the art, wherever objects are distributed among a cluster of appliances and managed by an appliance, the present invention may be advantageously applied. The scope of the present invention is not to be restricted to secure storage systems alone. As used herein, the term "key object" may include the key itself and other fields or attributes, e.g., a sequence number, a version number, a universally unique (for example an 16 byte or 124 bits may be used that defines very many numbers) identification number, and other fields as may be applicable in other environments. Generally, "key" refers to the actual encryption key while "key object" refers to the key and the other above fields that may accompany the key when stored. However, "key" and "key object" are used interchangeably in the art, but, in context, understood by those skilled in the art.

In a cluster of security appliance nodes, each node in the cluster has a unique identification and a separate identified space for storing key objects and a local sequence number space counter. Those key objects are assigned unique object identification and sequence numbers. Each key object, inserted into a node is identified by that node's ID, its own unique object identification number and a sequence number generated from its local sequence counter. In some applications other fields, e.g., version numbers, etc. may be appended to the above data fields within a key object. That newly inserted object, with the node's ID, the sequence number and any other appended fields, is then sent to all the nodes in the cluster. At the recipient node, each object is stored along with the sending node's (peer identification) ID, the received sequence number, the object's unique identification and any other fields. Since all the key objects are identified and stored in all the nodes, any one node may be used as a source for any key object. In this manner, the system is able to advantageously synchronize objects belonging to all the clustered nodes, even if a node goes offline.

In the above cluster comprising, for example, security appliances, a single appliance stores all the objects in the system (including objects of security appliances that have gone off line), and a standalone node, say an LKM, can receive key objects from that single security appliance. Illustratively, one on-line appliance may be elected as a leader or coordinator of the cluster, where that coordinator is the only appliance that will respond to a request for key objects from an LKM.

Illustratively, the organization of the different sequences within each node is identified by an SNS ID (Sequence Number Space Identifier) and an associated SNS CTR (counter). Each object within the SNS will have a unique Object Identifier. Each SNS ID is a persistent, globally unique identifier.

In order to ensure that the LKM reboots, e.g., after a power failure, the SNS IDs and the SNS CTRs are stored persistently in the LKM. If there is a power failure and reboot, the key synchronization resumes where it is left off instead of starting from the beginning.

According to an embodiment of the present invention, SNS IDs are being synchronized. Illustratively, the synchronization of nodes in the clustered environment, with SNS IDs, entails a process that may be split, illustratively, into two processes. The first process, referred to as the "SNS Sync Process," includes one node periodically querying another peer node and requesting the peer node's list of SNS IDs. For each node there is one SNS sync process. The peer node returns its list of SNS IDs. Since this list may contain the duplicate SNS IDs (returned earlier from other peers) that are discarded.

Illustratively, when a new SNS ID is returned to the requesting node, the received SNS ID is stored and an SNS CTR is created and set to zero As described herein, objects may then be received from this peer node and stored in the identified space (SNS ID) of the receiver.

In order to better organize and facilitate the processes, a peer map may be generated as a runtime structure that is maintained by the SNS Sync Process, and used by the "Object Sync Process" to route requests to the proper peers. An entry in this map includes the SNS ID and the peer that last returned that SNS ID during the SNS Sync Process. When an SNS ID is returned during the SNS Sync Process that is known to the requesting node, the peer map is updated.

The Object Sync Process operates to synchronize objects in a given SNS ID from a peer to a requesting node. Using the SNS ID as an entry into the Peer Map, the associated peer ID is found. In practice, the Object Sync Process synchronizes a stand alone node with another stand alone node or with the coordinator security appliance mentioned above.

For example, consider that from the SNS Sync Process, node N1 receives an SNS ID that N1 associates with peer P1 from the Peer Map. N1, sends out the SNS ID and N1's SNS CTR contents, say C, to P1. As discussed below in more detail, the difference between the SNS CTR contents at P1 and C represents the number of objects that are to be sent to synchronize with N1.

The present invention provides a local sequence counter in each node from which all sequence numbers for objects in SNS ID spaces are allocated. The counters are monotonically increasing counters, so that no two objects share the same sequence number.

As a new object, typically an encryption key object, is added or an existing encryption key object modified, the content of the local sequence counter is assigned to that object and then incremented, illustratively monotonically, in anticipation of receiving the next object. In addition a version number may be associated with the key object. When an existing encryption key object is modified, the version number is incremented and the local sequence counter content assigned to the encryption key object. The local sequence counter is then incremented. The sequence counter is ever increasing.

The present invention is described below with respect to encryption keys in secure storage systems, but, wherever objects are distributed among a cluster of systems and non-clustered nodes, the present invention may be advantageously applied. The scope of the invention is not to be restricted to secure storage systems alone.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN
ILLUSTRATIVE EMBODIMENT

A. Security Appliance Environment

Figure 1:
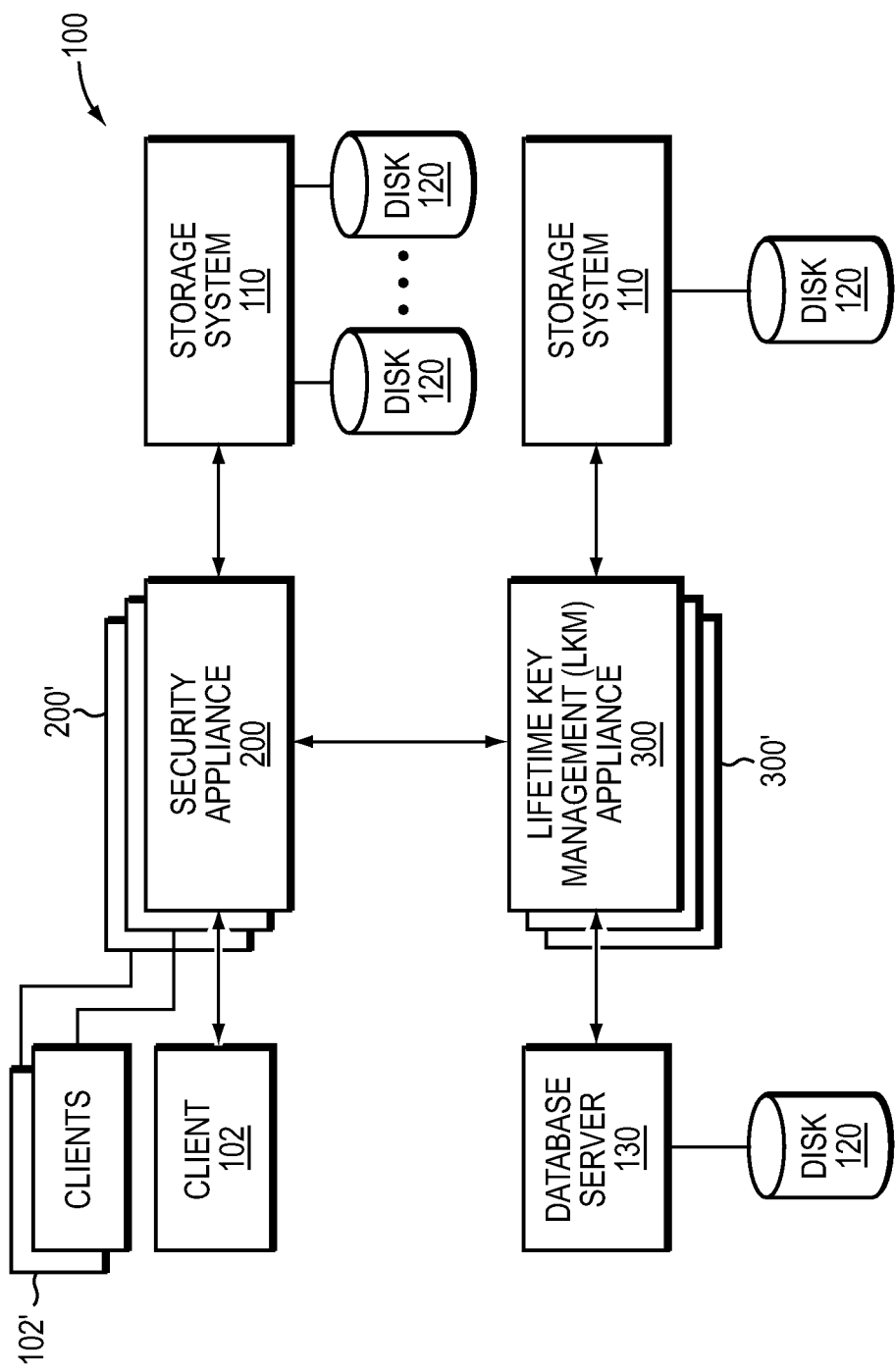
FIG. 1 is a schematic block diagram system of a multi-protocol preferred embodiment employing the present invention.

FIG. 1 is a schematic block diagram of an environment 100 including a cluster of multi-protocol security appliance 200 that may be advantageously used with the present invention. Each security appliance 200, 200' is coupled between one or more clients 102 and one or more storage systems 110. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

The storage system 110 is configured to provide storage service for both file and block protocol access to information stored on storage devices, such as disks 120. The storage system 110 is illustratively embodied as a system comprising a processor, a memory, a plurality of network adapters, and a storage adapter (these components are not shown in FIG. 1). The storage system 110 also includes a storage operating system (not shown) that includes a virtualization system including a file system to logically organize the information as a hierarchical structure of named directories, file and virtual disk (vdisk) storage objects on disks 120. The storage system 110 includes the interface to communicate with the security appliances 200, 200' and the LKM's 300, 300'.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

A lifetime key management (LKM) appliance 300 is configured to manage all encryption keys used by the security appliances to encrypt and decrypt data securely stored on the storage system 110, ensuring encryption key availability for the life of the secured data. For example, the LKM appliance 300 receives encrypted cryptainer keys from the security appliance 200 and sends encrypted cryptainer keys on demand to the appliance. The LKM appliance is further configured to support the cluster of security appliances 200, 200', such that, when a particular appliance encounters a data access request directed to a cryptainer for which it does not have the appropriate key, that appliance accesses the LKM appliance 300 to receive the appropriate key.

In one embodiment, the LKM appliance 300 and the security appliance 200 are in communication with other security appliances 200' and with other LKM appliances 300'. The other security appliances 200', in turn, connect to other clients 102'. As noted earlier, the security appliances and LKM appliances communicate over a link and embody "nodes." Clients, storage systems, database servers, and like hardware and software shown herein are not nodes. Furthermore, when one node communicates with another node, say via a secure link, that latter node is a "peer." If, for example, the security appliance 200 communicates with a security appliance 200', the security appliance 200' is a peer of the security appliance 200. Similarly, if the LKM 300 communicates with an LKM 300', LKM 300' is a peer of LKM 300, and if an LKM 300 communicates with a security appliance 200, that security appliance 200 is a peer of the LKM 300. When an LKM appliance communicates with a security appliance, the security appliance sends its new or newly modified keys to the LKM appliance. In this embodiment, the security appliance requests and receives up-to-date keys from an LKM as requested by a client.

The security appliances 200 and 200' are included within a cluster. LKMs 300 and 300' are standalone nodes that are not part of any cluster.

A leader or coordinator security appliance is automatically elected by the on-line (active) members of the cluster. The LKM appliances 300, 300' synchronizes key objects with the coordinator security appliance 200, 200' and thus obtains key objects from the entire cluster of security appliances. A trust relationship is established between each security appliance and LKM appliance using, e.g., a shared secret or certificate to establish a secure communications channel. Once the secure channel is established, any key generated by a security appliance can be forwarded t via the coordinator to the LKM appliance 300, for, e.g., storage in a key database (not shown). Similarly, when an inquiry from a client requires a key not found in the security appliance, that security appliance obtains the key from the LKM. Keys are created and/or modified in the various security appliances, and subsequently transferred to the LKMs. The LKMs synchronize the key objects to suitably service the security appliances.

Figure 3:
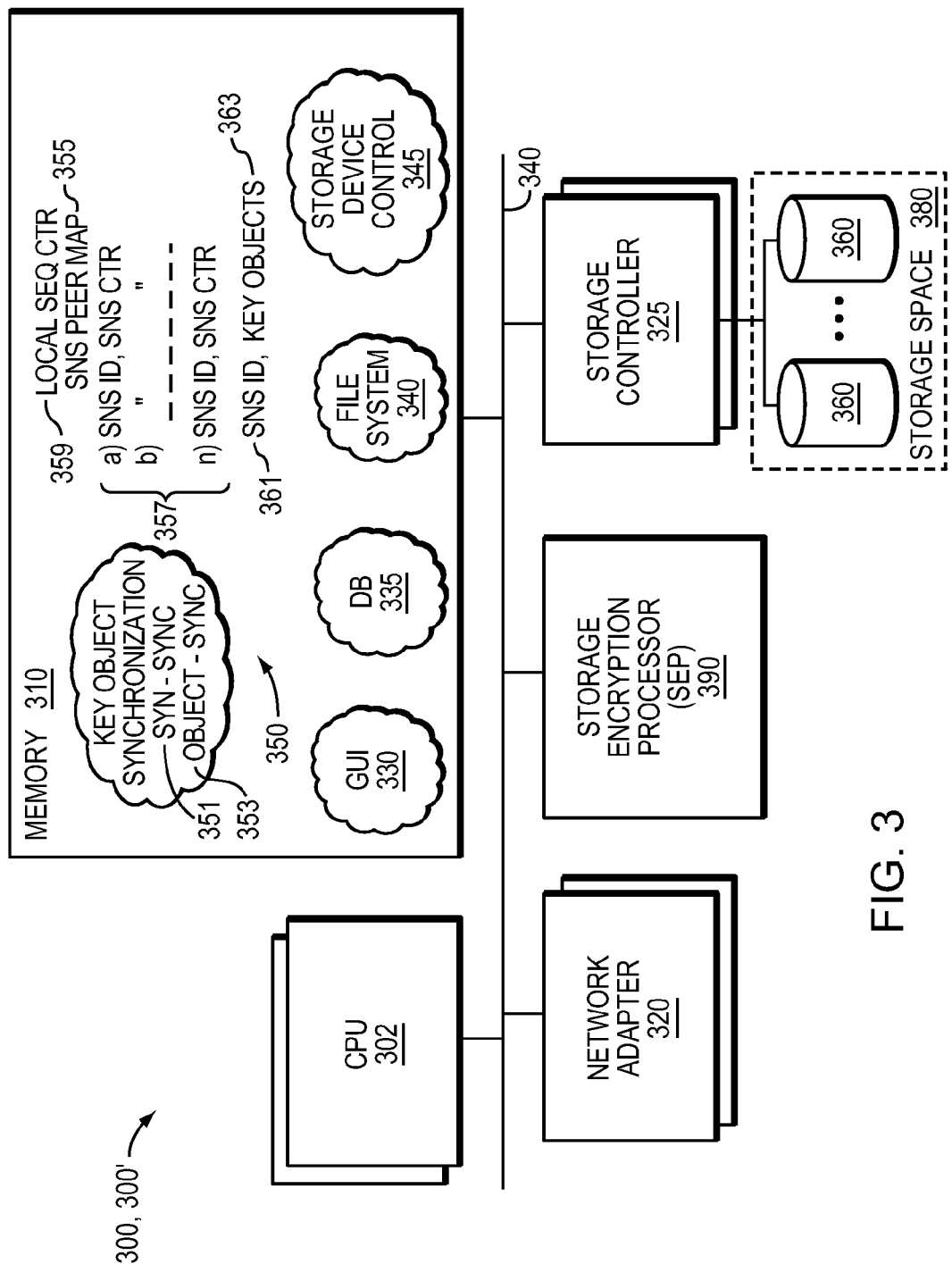
FIG. 3 is a schematic block diagram of a lifetime key management (LKM) server in accordance with the present invention.

The LKM appliance 300 is interconnected to a database server 130, which includes additional storage devices such as disks 120. Alternatively, a second storage system 110 may be interconnected with the LKM appliance 300. In an alternative embodiment of the present invention, the LKM appliance 300 may utilize the external database server 130 for storage of keys. Thus, in such an embodiment, the database server 130 may execute a database application (not shown) implementing, e.g., a conventional SQ-L compliant database. Illustratively, the LKM appliance 300 includes a set of internal storage 380 as shown in FIG. 3 described further below. However, in alternative embodiments, the LKM appliance 300 may utilize external storage, such as that offered by storage system 110 of FIG. 1. It should be noted that while the LKM appliance 300 is shown interconnected to a database server 130 and a storage system 110, these are shown for illustrative purposes only. As such, neither database server 130 nor storage system 110 is necessary for operation of a LKM appliance 300.

Furthermore, in embodiments where the LKM appliances 300, 300' are implemented within a single environment, each LKM appliance may utilize a different storage technique. Thus, for example, a first LKM appliance 300 may utilize internal storage, a second LKM appliance 300' may utilize a database server 130 for key storage, while a third LKM appliance 300' utilizes external storage provided by storage system 110. As can be appreciated by one skilled in the art, by the use of a LKM appliance 300, administrators are provided with additional configuration capabilities to meet specific environmental and/or security concerns.

B. Security Appliance

Figure 2:
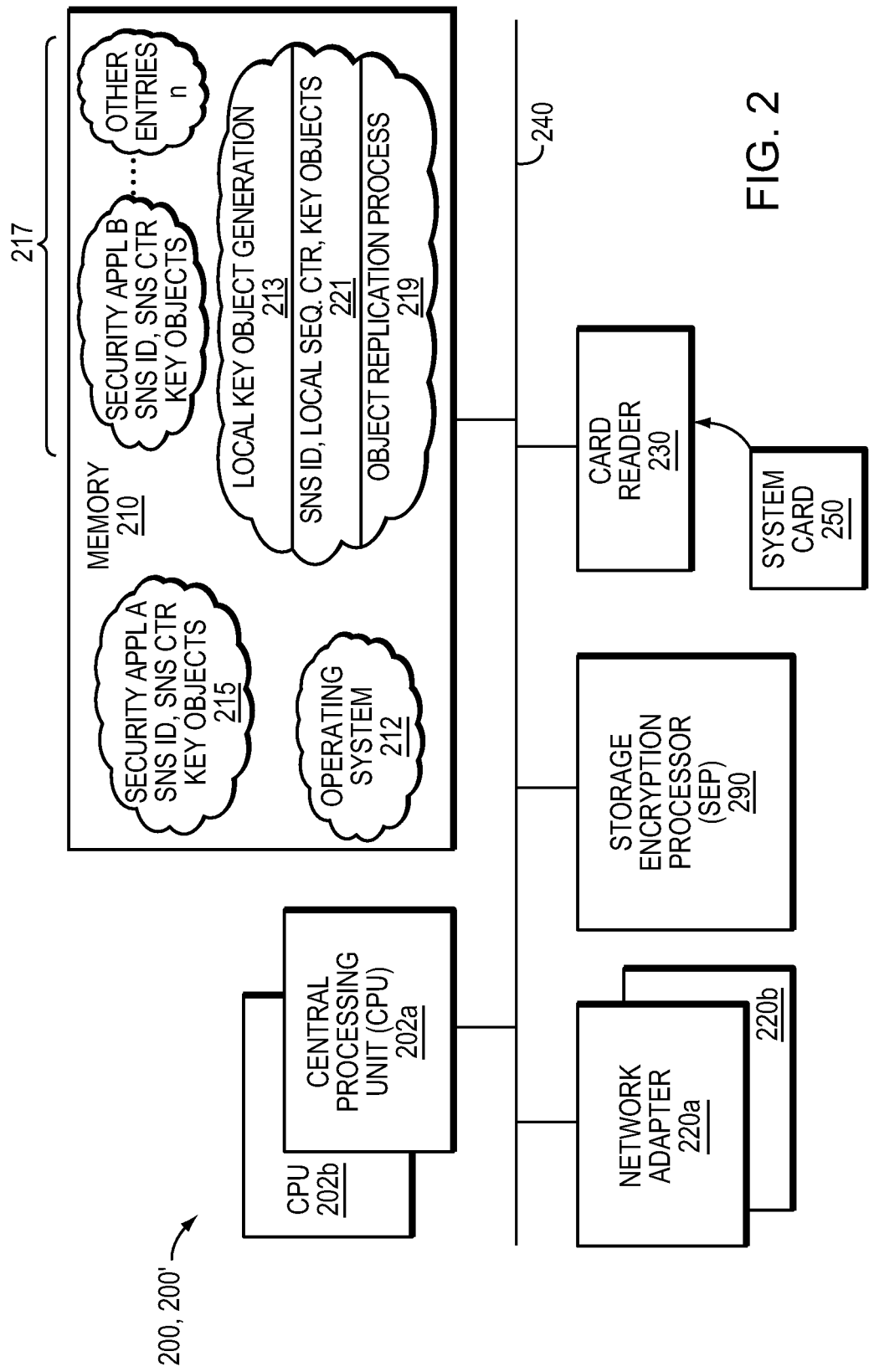
FIG. 2 is a schematic block diagram of a cluster of multi-protocol security appliances that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 202a,b), a memory 210, one or more network adapters 220a, b, a storage encryption processor (SEP) 290, and a card reader 230 interconnected by a system bus 240, such as a conventional Peripheral Component Interconnect (PCI) bus. The SEP 290 is configured to perform all encryption and decryption operations for the security appliance in a secure manner; for example, the SEP is configured to protect plaintext encryption keys from system software executing on each CPU 202. Accordingly, the SEP is illustratively embodied as a Federal Information Processing Standards (FIPS) certified module that is mounted onto a dedicated interface card or other similar card.

Since the SEP 290 protects encryption keys from being "touched" (processed) by the system software executing on the CPU 202, a mechanism is needed to load keys into the SEP and retrieve keys from the SEP. To that end, the card reader 230 provides an interface between a "smart" system card 250 and the SEP 290 for purposes of exchanging encryption keys. Illustratively, the system card is a FIPS certified card that is configured with customized software code. Note that the SEP protection prevents the operating system and/or other system software from compromising the security of the systems described herein.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Each clustered security appliance 200, 200' can generate encryption keys using a local key object generation process. This process, in turn, utilizes a local sequence counter 221, a local SNS (Sequence Number Space), and an SNS ID (an Identifier for that space) 213. This local key object generation serves to create encryption keys in response to clients' requests and store those keys in an identified space (SNS ID), together with a sequence counter representing the last key object so created in that security appliance. In addition, key objects created within other security appliances within a cluster are transferred and stored within each of the security appliances within the cluster. For example, SNS ID, SNS CTR and the objects created in, e.g., security appliance A 215 are transferred into the memory 210 of security appliance within the cluster. Similarly, key objects, generated in the clustered security appliance B and the other clustered security appliances 217, are transferred and stored in each security appliance's memory 210. As a result, each clustered security appliance has a list or table including SNS IDs, SNS CTRs, and key objects for all the clustered security appliances, including its own objects. An Object Replication Process 219 defines the process of transferring of key objects among the security appliances. In one illustrative implementation, a synchronous two-phase-commit process is used, where a transfer between a sender and a receiver is successful before another transfer is attempted. This process is well known to those in the art, but other processes, for example asynchronous transfers, can be advantageously employed. In addition, as known to those skilled in the art, the data structure shown in FIG. 2 is exemplary for understanding, but the actual structure may be quite different. For example, there might be a structure of key objects identified with an SNS ID and an SNS CTR, but they may not be stored in the same structure with the key objects.

According to an embodiment of the present invention, a security appliance is assigned an appliance ID number within the cluster. Illustratively, a five bit non-negative number is used. These IDs are shared among the cluster members, and each member maintains a heartbeat with all the other cluster members. That is, each contacts the others on a regular time basis. If one member does not respond, that member is assumed to be offline. When this occurs, the member with the lowest appliance ID number is automatically elected as the coordinator. As known to those skilled in the art, other arrangements may be used to elect the coordinator. As described herein, when, a standalone LKM appliance synchronizes with the coordinator, it will receive the data for encryption key objects from all the clustered security appliances.

FIG. 3 is a schematic block diagram of an LKM appliance 300, 300' in accordance with the present invention. A hardened hardware platform is utilized as the LKM appliance that includes an SEP for management of keys among a cluster of security appliances. Specifically, the LKM appliance implements secure storage for cryptainers' encryption keys that are adapted for use with the security appliances. To that end, the LKM appliance implements a key object database (as well as raw storage) to track and manage the encryption keys. Illustratively, newly received keys can be stored (i) in the key object identified space, which is overlaid onto a file system of the internal memory 210 of FIG. 2, and (ii) as key object insertion entries on a raw storage partition of the memory 210. Alternately, the key objects may be stored on an external database server in an encrypted form or on a storage system configured as external storage.

In more detail, the LKM appliance 300 of FIG. 3 comprises one or more processors, e.g., central processing units (CPU 302), a memory 310, one or more network adapters 320, SEP 390 and a storage controller 325 interconnected by a system bus 340, such as a conventional Peripheral Component Interconnect (PCI) bus. The SEP 390 is configured to perform encryption and decryption operations for the LKM appliance in a secure manner; for example, the SEP 390 may be configured to protect plaintext encryption keys from software executing on each CPU 302. Accordingly, the SEP 390 is illustratively embodied as a FIPS certified module that is mounted onto a dedicated interface card or other similar card.

The network adapters 320 couple the LKM appliance 300 to one or more security appliances 200 over point-to-point links, wide area networks, virtual private networks implemented over a public network (Internet) or shared local area networks.

The memory 310 illustratively comprises storage locations that are addressable by the processors and adapters for storing software processes and data structures associated with the present invention. The processor and adapters may, in turn, comprise processing elements and/or logic circuitry configured to execute the processes and manipulate the data structures. In alternative embodiments, the processes may be implemented in software, hardware, firmware and/or a combination thereof. As such, the description of processes being implemented in software should be taken as exemplary only. It will be apparent to those skilled in the art that other processing and memory means, including various computer readable media, may be used for storing and executing program instructions pertaining to the invention described herein.

The processes include, e.g., a graphical user interface (GUI) process 330, a database (DB) process 335, a file system process 340, a storage device control process 345 and a key object synchronization process 350. Illustratively, each of these processes may be implemented as part of an operating system (not shown) executing on the LKM appliance 300. However, in alternative embodiments, each of these processes may be independent of an operating system and may operate, e.g., as a user mode application on the LKM appliance 300.

The storage device control process 345 may be utilized in managing the storage controller 325 and storage space 380 provided by internal disks 360. Illustratively, the storage device control process 345 may also manage external storage, such as that provided by an external storage system 110.

The GUI process 330 provides a graphical user interface for administrators to configure the key management functionality of the LKM 300. In alternative embodiments other forms of user interfaces, such as a command line interface (CLI), may be implemented. The database (DB) process 335 implements a database for use in storing and managing keys. Illustratively, the database process 335 implements a database provided on storage space 380 disposed on internal storage devices 160 manage by the storage controller 325. Storage space 380 may include a partition adapted to hold a file system implemented by file system process 340 in conjunction with storage device control process 345. In the example of processes executing as part of a conventional BSD (Berkeley Software Distribution) kernel, the file system process 340 may implement a conventional UFS (Unix file System) file system over all or a portion of storage space 380 managed by storage controller 325. Alternatively, the DB process 335 may interact with an external database server 130 to implement storage of keys on the server 130. In embodiments utilizing an external storage system 110 (FIG. 1), the DB process 335 may implement a database on storage space provided by the external storage system 110. Illustratively, the DB process 335 implements a conventional SQL database; however in alternative embodiments, other data storage and/or retrieval mechanisms may be utilized.

The key object synchronization process 350 illustratively implements functionality to distribute keys between pairs of LKM appliances 300 and 300' and between LKMs and a coordinator security appliance installed within a common network environment. Thus, for example, the key synchronization process ensures that new keys, entered into one LKM appliance 300 within the environment, are distributed (i.e. synchronized) to the other LKM appliance within the environment. If there are more than two LKM appliances, all the pairs are synchronized independently. The synchronization process is, illustratively, split into a SNS Sync Process 351, and an Object Sync Process 353.

Key synchronization, as discussed below, performs atomic storage to ensure that the key objects will not be corrupted. A sequence of operations performed atomically is one in which either all the contained operations fail, or all the contained operations succeed.

The Key Object Synchronization Process 350 includes a local SNS sequence counter 359, an SNS Peer Map 355 and a table or list 357 of SNS IDs and corresponding SNS CTRs associated with the peers. The synchronization process is controlled by use of an SNS in the receiving LKM and the SNS ID and an SNS CTR 357 for each peer SNS ID, and the local sequence counter 359 for the receiving LKM, as described below.

Generally, as mentioned above, the process for synchronizing encryption key objects ensures that up-to-date keys are stored in the LKM appliances, 300, 300'. To initiate this synchronization, a first LKM appliance (or node) queries a second LKM appliance or the coordinator security appliance (a peer node) asking it to send its list of SNS IDs. The first LKM then, after receiving an SNS ID, finds (from the Peer Map 355) which peer should be queried with respect to the received SNS ID. The first LKM sends the SNS ID to that peer and the highest sequence number SNS CTR 357 known to the first LKM appliance that is associated with the that SNS ID. The highest sequence number, presumably from an earlier synchronization, corresponds to the key object received from that peer most recently. The peer in the meantime might have received additional key objects that are associated with that SNS ID. When the peer received highest sequence number from the LKM, the peer returns a key object from its key object database that has an equal or higher SNS CTR sequence number. That key object is stored in the first LKM appliance with the received SNS CTR sequence number. This process repeats between the LKM appliances in both directions until each is fully synchronized with the other LKM appliances—each having up-to-date valid key objects.

Duplicate keys are deleted from the LKM appliances and the synchronization will stop (converge) when no new keys are generated. Those skilled in the art would understand that the stored key objects are not corrupted, so the various storage processes described herein should be accomplished via atomic operations, as known to those skilled in the art.

The local sequence counter 359 contains sequence numbers allocated to objects, preferably in a monotonically increasing sequence, wherein no two objects within an SNS share the same sequence number. The counter is preferably implemented in the memory, but may be implemented in other functional locations, as one skilled in the art would understand. In one preferred embodiment, the sequence counter is 64 bits long, but other lengths may be used to advantage in other applications. In addition, as described herein, if an existing key object is modified, a version number, associated with the key, is incremented. If a new key is created and transferred to the LKM appliance, the next higher SNS CTR sequence number and a version number are associated with it.

SNS IDs and SNS CTRs 357 reside preferably in persistent memory 310 and the SNS CTRs contain a count representing the highest sequence count from key objects previously synchronized with its peer appliance. As mentioned before, the persistent memory (data remains intact when not powered) allows the key synchronization to resume where it left off rather than starting at the beginning again. The various SNS CTRs represent the state of synchronization among the cluster and the standalone nodes. Note that each LKM appliance has is own local sequence counter and SNS CTRs that co-exist with those of other appliances.

Figures 4, 5:
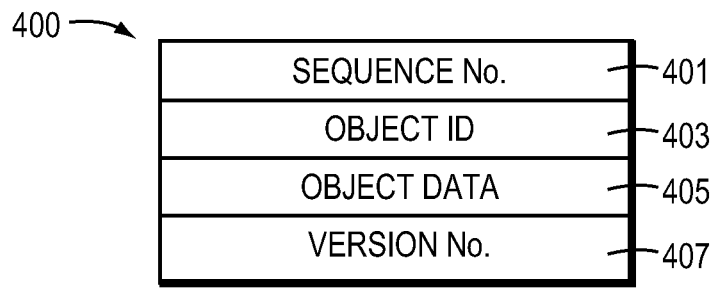
FIG. 4 is one possible data structure for an object.
FIG. 5 is an illustrative Peer Map.

FIG. 4 is a block diagram of the content fields of a key object 400 that may be synchronized advantageously as described herein. Each object 400 has a sequence number 401 that is a non-negative integer. An Object ID 403 is a non-negative integer that is a globally unique identifier of this particular object. Illustratively, the integer may be 128 bits long. An Object data 405 is a field representing the object itself, for example, if the object is a key, the Object Data 405 might be the key itself. Additionally, there may be a version number 407 that tracks modifications to the same key.

The present invention, as mentioned above, involves synchronizing of SNS IDs, and to help enable such synchronizing, as explained below, an SNS Peer Map (shown in FIG. 5), is created at run time and maintained by the SNS Sync Process. When objects are being synchronized among peers, the Object Sync Process, explained below, uses the SNS Peer Map to route queries to the proper peer. There is one entry in the map per SNS ID 501. Each entry contains the peer 503 that last returned a particular SNS ID 505 to the SNS Sync Process.

Figure 6:
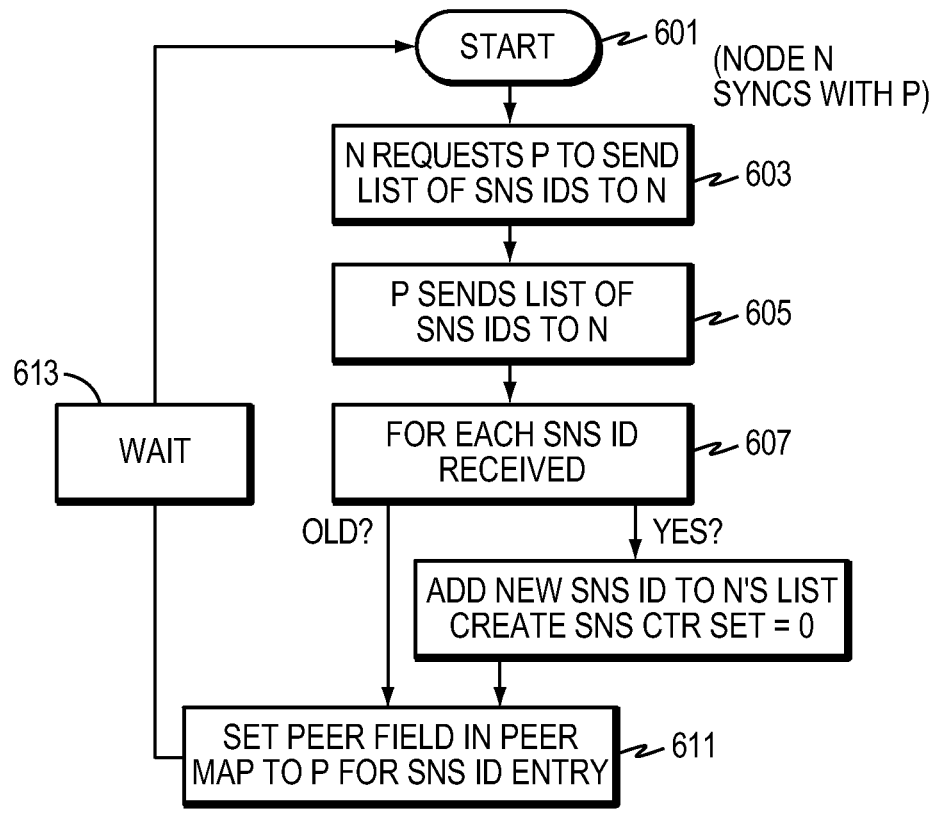
FIG. 6 flow chart of an SNS ID synchronization process (SNS Sync Process) in accordance with the present invention.

FIG. 6 is a flow chart illustrating the SNS Sync Process. The process starts at step 601 and proceeds to step 603 where a node N, typically an LKM, periodically asks a peer, P, for its list of SNS IDs. In step 605, P returns to N its list of SNS IDs. In step 607, for each received SNS ID, N determines if the SNS ID is new or already stored at N. If new, in step 609 N adds the new SNS ID to its list and creates an SNS CTR with contents of zero. If the received SNS ID is old, step 611 is performed where N sets the Peer Map to associate the SNS ID with P. The process enters the wait step 613 before returning to the start 601. The wait step 613 prevents the queries from flooding the system.

Figure 7:
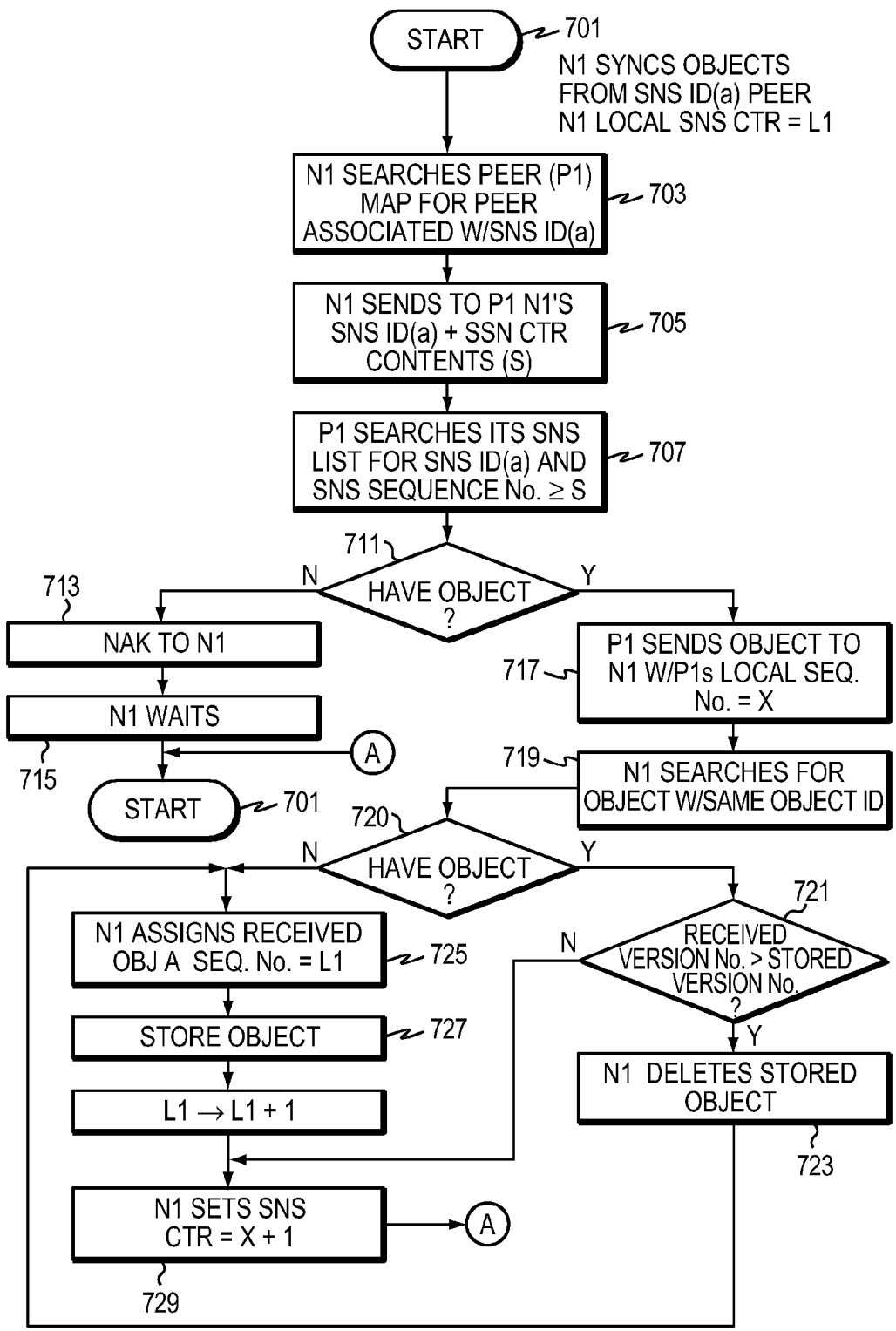
FIG. 7 is a flow chart of an Object Sync Process in accordance with the present invention.

FIG. 7 illustrates the Object Sync Process for synchronizing a node with an SNS ID found at a particular peer determined from the Peer Map. As described herein, this synchronization occurs, illustratively, between a node having an LKM and a peer node having an LKM or a coordinator security appliance.

Steps in the FIG. 7 flow chart describe a node synchronizing objects from a particular SNS ID within the selected peer. The process starts at step 701, where a particular node, N1, determines to synchronize its objects, typically key objects, with an SNS ID(a). At step 703, N1 searches its Peer Map for the peer, P1, associated with that SNS ID(a). In step 705, N1 sends to SNS ID(a) to P1 and the associated SNS CTR (359 in FIG. 3) contents, S. In step 707, P1 searches its storage for an object indexed under SNS ID(a) with a local SNS CTR contents at least equal to S. If there is no object, in step 711 P1 sends a negative response, NAK, back to N1 in step 713, and the process returns to start 701 after waiting in step 715.

In step 709, if P1 has an object with an SNS CTR contents equal to or greater than S, then, in step 717, P1 sends the object to N1 with the SNS CTR contents, say X, associated with that object. In step 719, N1 searches its data store for objects with the same Object ID as the received object. If one is found in step 720 and if the received version number is greater than the stored version number in step 721, then N1 deletes the stored object and proceeds to step 725. If the received version is not higher that the stored version, the process continues at step 729 where N1 sets the SNS CTR to X+1.

Otherwise, in step 725, N1 assigns its local sequence number L1 to the object and, is in step 727, stores the object and increments L1 In step 729, N1 sets S to X+1, and returns to start 701.

It should be understood that above-described embodiments are being presented herein as examples and that many variations and alternatives thereof are possible. Accordingly, the present invention should be viewed broadly as being defined only as set forth in the hereinafter appended claims. A person of ordinary skill in the art would understand that the LKM appliance can be implemented as a management console that manages operations of the storage system 110. Further, the security appliance can be implemented as part of the operating system executed at the storage system 110.

What is claimed is:

1. A system for synchronizing encryption key objects between an appliance and a peer, the encryption key objects generated within a cluster of security appliances, the system comprising:
    a sequence number space (SNS) within a memory of the appliance having a processor, the SNS including a SNS identifier (ID) that identifies a peer, the SNS utilized to store for storing objects created by the peer, wherein the appliance is further configured to create a peer map to route a query to the peer, wherein the peer map associates the peer with the SNS;
    a first sequence counter for the SNS ID maintained at the appliance, the first sequence counter configured to represent a first number of the encryption key objects previously received by the appliance from the peer and stored in the SNS;
    a second sequence counter associated with the SNS ID and configured to represent a second number of the encryption key objects stored in a peer SNS of the peer; and
    an object synchronization process, executed on the appliance, and configured to transmit to the peer a value of the first sequence counter corresponding to the SNS ID of the appliance, wherein the peer is configured to only transmit to the appliance the encryption key objects stored within the peer SNS of the peer that are associated with a value of the second sequence counter that is equal to or higher than the transmitted value of the first sequence counter.

2. The system of claim 1 further comprising a unique identifier associated with the appliance, the peer, and each stored encryption key object.

3. The system of claim 1, wherein the appliance is further configured to store the transmitted encryption key objects at the SNS, the appliance further configured to increment the value of the first sequence counter in response to storing the transmitted encryption key objects.

4. A system for synchronizing encryption key objects between a first node and a second node, comprising:
    the first node having a processor and a memory, and configured to maintain a first sequence number space (SNS) having a first SNS identifier (ID), the first SNS being associated with the second node;
    the first node maintaining a sequence number counter associated with the first SNS ID, the sequence number counter indicating a number of the encryption key objects the first node previously received from the second node;
    the first node maintaining at least one peer map, wherein the peer map associates the second node with the first SNS ID;
    the second node maintaining a local sequence counter representing a number of the encryption key objects created by the second node; and
    the first node configured to transmit to the second node the sequence number counter, wherein the second node is configured to only transmit to the first node the encryption key objects stored at the second node that have local sequence counter values that are equal to or higher than the sequence number counter associated with the first SNS ID indicating the number of the encryption key objects the first node previously received from the second node.

5. The system of claim 1 further comprising a version number associated with each stored encryption key object, the version number incremented in response to a modification of the encryption key object.

6. The system of claim 1 wherein the appliance is further configured to create a new SNS, and a new sequence counter associated with the new SNS in response to receiving at least one encryption key objects that is not currently stored in the first SNS.

7. A method for synchronizing encryption key objects, comprising:
    assigning one or more sequence number spaces within a first node for storing encryption key objects associated with the first node and with different nodes:
    consulting a peer map that associates a second node with the one or more sequence number spaces;
    requesting that a selected different nodes send a list of sequence number spaces to the first node;
    receiving, at the first node, the list;
    transmitting, to a node identified from the list, a first sequence number space identifier and a sequence number space counter value associated with the identified node, wherein the sequence number space counter value represents a number of encryption key objects that are stored in a first identified sequence number space of the first node and previously received from the identified node;
    receiving, at the first node from the identified node, at least one encryption key object stored at the identified node that has a count that is equal or a higher than the transmitted sequence number space counter value; and
    storing the at least one encryption key object and an updated sequence number space counter value in the first identified sequence number space at the first node.

8. The method of claim 7 further comprising associating a unique identifier with each of the first node, the identified node, and each of the stored encryption key objects.

9. The method of claim 7 further comprising:
    electing a coordinator security appliance as the identified node,
    wherein the coordinator security appliance is the only node that responds to a request from the first node to synchronize the stored encryption key objects.

10. The method of claim 9, further comprising:
    incrementing the sequence number counter with each stored encryption key object.

* * * * *

UNITED STATES PATENT AND TRADEMARK OFFICE
CERTIFICATE OF CORRECTION

PATENT NO. : 8,824,686 B1  
APPLICATION NO. : 11/741495  
DATED : September 2, 2014  
INVENTOR(S) : Hiroshi Ishii et al.

Page 1 of 1

It is certified that error appears in the above-identified patent and that said Letters Patent is hereby corrected as shown below:

In the Specification

Column 1, line 47 should read  
ing to pre-defined protocols, such as the Transmission Control Column 13, line 5 should read  
ber L1 to the object and, in step 727, stores the object and In the Claims Claim 1, column 13, line 26 should read  
store objects created by the peer, wherein the Signed and Sealed this  
Twenty-third Day of December, 2014

Michelle K. Lee  
*Deputy Director of the United States Patent and Trademark Office*